United States Patent [19]

Katsumoto et al.

[11] Patent Number: 4,538,856
[45] Date of Patent: Sep. 3, 1985

[54] RECLINING ANGLE ADJUSTMENT DEVICE

[75] Inventors: Naoaki Katsumoto; Hideyuki Ohshiro; Masanori Sakai, all of Fujisawa, Japan

[73] Assignee: Shiroki Kinzoku Kogyo Kabushiki Kaisha, Kanagawa, Japan

[21] Appl. No.: 420,604

[22] Filed: Sep. 20, 1982

[51] Int. Cl.³ .............................................. B60N 1/06
[52] U.S. Cl. ..................................... 297/367; 16/333; 16/334; 74/157; 297/369
[58] Field of Search .............................. 297/366–369, 297/354, 355; 74/157, 142; 16/333, 334, 344, 347, 374

[56] References Cited

U.S. PATENT DOCUMENTS

| 1,487,409 | 3/1924 | Wallin | 74/157 X |
| 1,807,466 | 5/1931 | Brokenmaier | 74/157 |
| 1,814,140 | 7/1931 | Flintermann | 74/157 |
| 3,299,466 | 1/1967 | Werner | 297/366 X |
| 3,877,232 | 6/1975 | Dinkel | 297/367 |
| 3,900,225 | 8/1975 | Wirtz et al. | 297/367 |

FOREIGN PATENT DOCUMENTS

| 2459070 | of 1975 | Fed. Rep. of Germany | 297/366 |
| 2845281 | of 1980 | Fed. Rep. of Germany | 297/366 |
| 1232189 | of 1960 | France | 297/369 |

Primary Examiner—William E. Lyddane
Assistant Examiner—Peter R. Brown
Attorney, Agent, or Firm—Birch, Stewart, Kolasch & Birch

[57] ABSTRACT

A reclining angle adjustment device used to obtain best inclination of a reclining seat for passengers, including a seat back arm fixed to a seat back portion, a base arm with an internal gear connected with the seat back arm through an axis, a stopper, a regulating plate, the first control lever and the second control lever. For rough adjustment, the first control lever is inclined forwardly or backwardly by a passenger on seat so as to disengage the stopper from the regulating plate. For minute adjustment, the second control lever is repeatedly moved round upwardly and downwardly so as to roll a pinion in the internal gear provided in the seat back arm.

6 Claims, 8 Drawing Figures

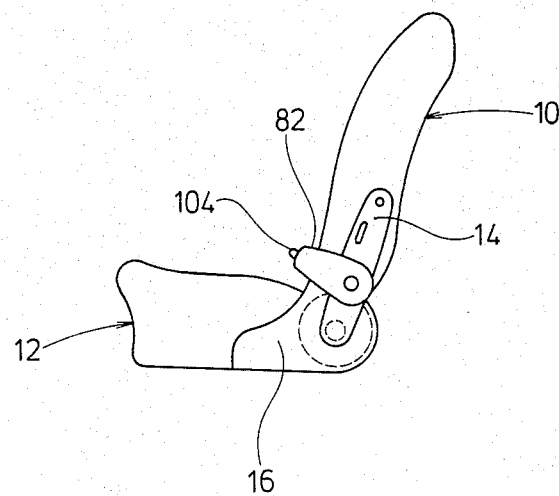
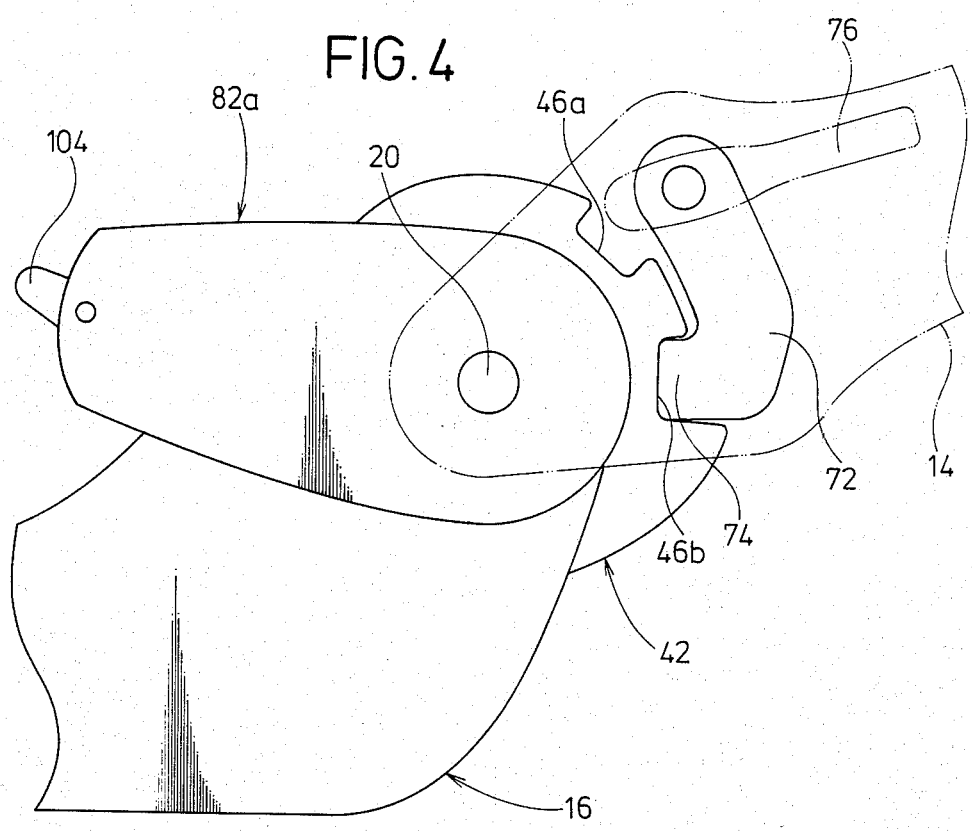

RECLINING ANGLE ADJUSTMENT DEVICE

BACKGROUND OF THE INVENTION

The present invention relates to a reclining angle adjusting device for reclining seats for cars, airplanes and so forth and more particularly to a reclining angle adjusting device through which both minute adjustment and rough adjustment are performed easily.

Reclining seats which are adjustable to a predetermined angle of inclination to conform to operators and passengers are popular in cars, airplanes and so forth in order to reduce their fatigue and secure their safety.

Adjustment of reclining angle is divided into two categories one of which is called rough adjustment and the other of which is called minute adjustment. In these categories, the former provides a preferable inclination of reclining seat for an operator roughly and quickly whereas the latter provides the best inclination for the operator after rough and quick adjustment.

In conventional reclining angle adjusting devices, a rod type lever is used for rough adjustment and a round handle is used for minute adjustment so that the devices become complex in their construction. Further, a passenger on the seat is required to incline the lever forwardly or backwardly for rough adjustment whereas the passenger is again required to rotate the handle clockwise or counterclockwise for minute adjustment. That is, the passenger is required to perform two different operations for rough adjustment and minute adjustment respectively so that a broader space is necessarily provided for both adjustments. However, it is a critical disadvantage relative to cars, airplanes, and so forth which have to make use of the narrowest space therein as much as possible.

Jitsuyo Shinan Kokoku Koho (Japanese Utility Model Registration Publication) published for opposition under the publication No.54(1979)-408 on Jan. 11, 1979 relates to a stepless minute adjustment device for a reclining seat. The specification and drawings comprising the above publication show a rod type lever for rough adjustment and a round handle for minute adjustment, i.e. an operation lever is used for rough adjustment and a round grip is used for minute adjustment. In operation of the above device, rough adjustment will be performed by inclining the lever. Then, minute adjustment will be performed by rotating the grip. The passenger would be inconvenienced by the above operation.

SUMMARY OF THE INVENTION

It is a principal object of the present invention to provide a reclining angle adjustment device by which a passenger on seat can perform rough and minute adjustment of inclination of a reclining seat easily and quickly.

It is another object of the recent invention to provide a reclining angle adjustment device which is simple in construction so that it is easy to manufacture.

It is a further object of the present invention to provide a reclining angle adjustment device which is inexpensive to manufacture.

The foregoing and other objects, features and advantages of the present invention will be apparent from the following more particular description of preferred embodiments of the invention as illustrated in the accompanying drawings.

BRIEF DESCRIPTION OF THE DRAWINGS

FIG. 1 is a front view of a reclining angle adjustment device according to the present invention.

FIG. 4 is a front view of a portion of a reclining angle adjustment device in which a back seat is largely inclined.

DETAILED DESCRIPTION OF THE INVENTION

Figure 2:
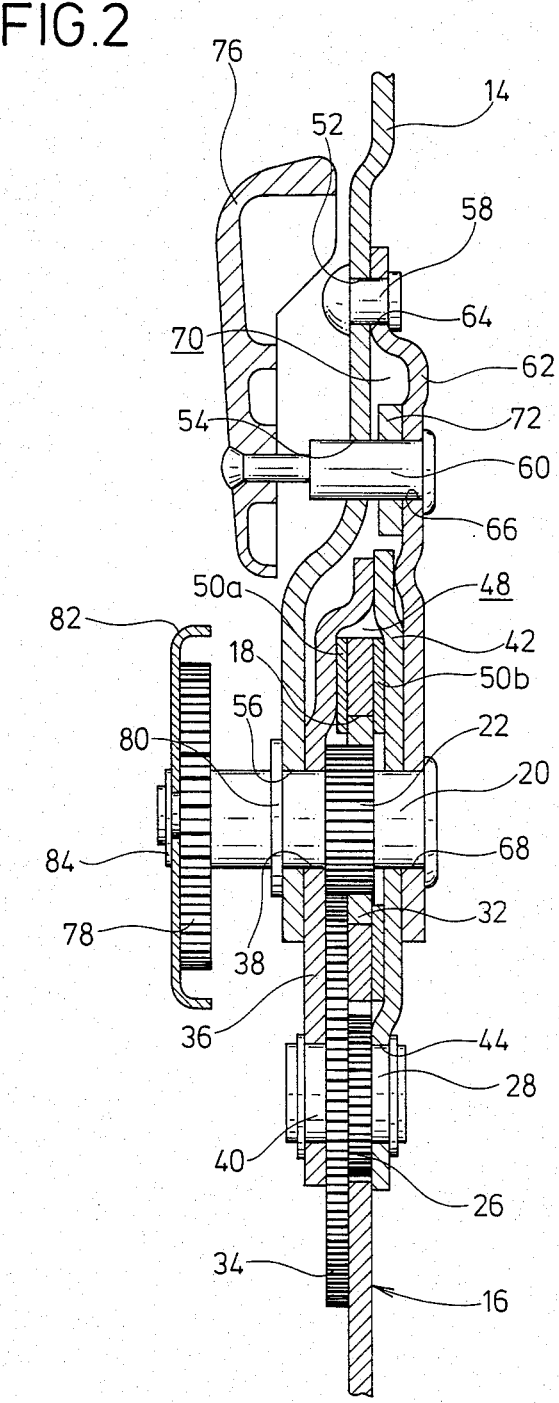
FIG. 2 is a longitudinal cross-section view of a reclining angle adjustment device according to the present invention.

In FIG. 1, reference numeral 10 identifies a seat back or back rest portion of a reclining seat and reference numeral 12 identifies a seat portion of the reclining seat. A reclining angle adjustment device according to the present invention is provided between the seat back portion 10 and seat portion 12. A seat back arm 14 is secured to the seat back portion 10 and a base arm 16 is also secured to the seat back arm 12 by means of a conventional technique. A hole 18 is provided at the upper portion of base arm 16 to insert the first axis 20 with the first pinion 22 while a hole 24 having an arc type internal gear therein is provided at the middle portion of base arm 16 to roll the second pinion 26 which is fixed on the second axis 28. As apparent from FIGS. 2 and 3, on the one hand, the first pinion 22 fixed to the first axis 20 is in engagement with an internal gear 30 which is provided in a brake plate 32 of disc type. On the other hand, the first pinion 22 is in engagement with a gear 34 which has large diameter and is mounted on the second axis 28. Brake plate 32 is fitted into hole 18 of base arm 16 to be rotated therein with a given friction force.

The first auxiliary arm member 36 supporting the first pinion 22 and gear 34 on one side thereof is mounted on the first axis 20 and the second axis 28. That is, the first auxiliary arm member 36 bent at the upper portion thereof is made of a metal plate and a hole 38 is provided at a flat portion thereof to pass through the first axis 20. Further, a hole 40 is provided under hole 38 in the first auxiliary arm member 36 to pass through the second axis 28. As shown in FIG. 2, the first auxiliary arm member 36 is crooked inwardly at its upper end portion so that the first pinion 22, second pinion 26 and gear 34 are held between the arm member 36 and a regulating plate for rough adjustment 42.

Figure 3:
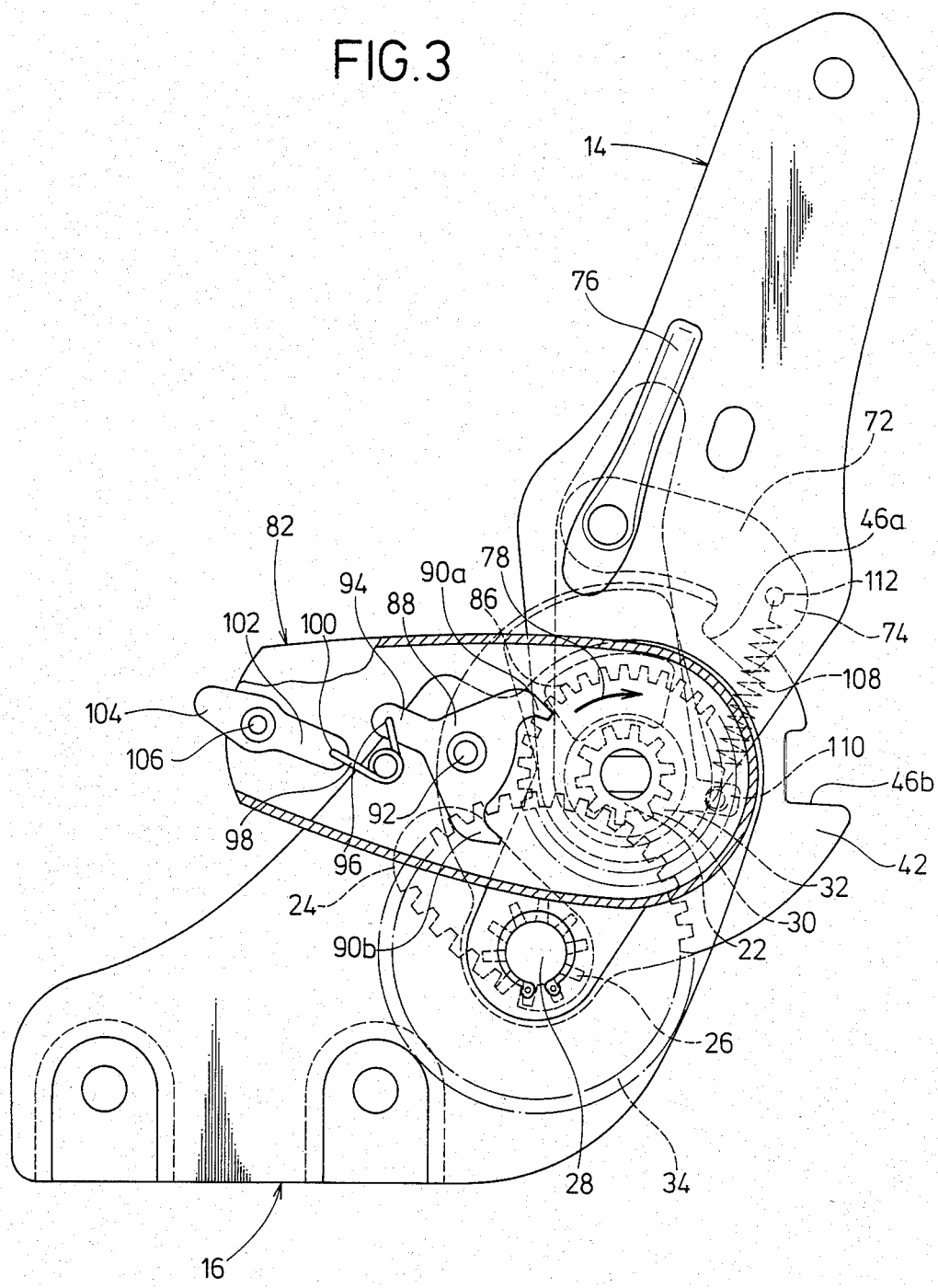
FIG. 3 is a front view of a reclining angle adjustment device of which part is broken away to show a sectional view of the second control lever.

Regulating plate 42 is made of metal of disc type of which the outer periphery is bent inwardly to attach its upper portion to the first auxiliary arm member and to form a hole 44 at its lower portion to pass through the second axis 28. At the peripheral portion of regulating plate 42 two rectangular recesses 46a and 46b are provided to be selectively engaged with a stopper as described hereinafter. A crooked upper portion of regulating plate 42 defines a space 48 with the upper portion of the first auxiliary arm member 36. It is preferrable to provide spacers 50a and 50b in space 48 to face a side wall of base arm 16 to a side wall of brake plate 32 therebetween. As shown in FIG. 3, spacer 50a is shaped like a fan whereas spacer 50b is shaped like a disc.

Referring to FIG. 2, the upper portion and the lower portion of seat back arm 14 are bent in opposite directions relative to each other. Holes 52 and 54 are provided at the middle portion thereof while a large diameter hole 56 is formed at the lower portion to pass through the first axis 20. A rivet 58 is passed through hole 52 while a rotating shaft 60 is passed through hole 54. End portions of rivet 58 and rotating shaft 60 are caulked respectively to the second auxiliary arm member 62. Thus, the second auxiliary arm member 62 includes holes 64 and 66 for rivet 58 and rotating shaft 60 respectively. Further, a hole 68 is provided at a rounded end portion of the second auxiliary arm member 62 to pass through the first axis 20. The second auxiliary arm member 62 is bent relative to seat back arm 14 between holes 64 and 66 to define a space 70 in which a stopper 72 is provided. Stopper 72 is secured to rotating axis 60 through a hole provided at one end portion thereof whereas the other portion elongates downwardly from the body to form a pawl 74 as shown in FIG. 4. Thus, when the first control lever 76 secured to rotating axis 60 is inclined forwardly or backwardly, stopper 72 moves round simultaneously with the first control lever 76 in the same direction.

Figure 8:
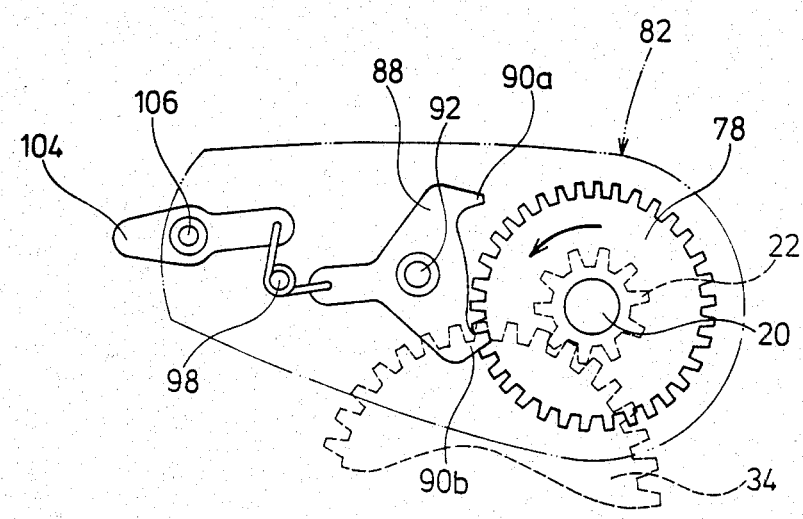
FIG. 8 is a front view of a feeding pawl member and a feeding gear according to the present invention.
Figure 6:
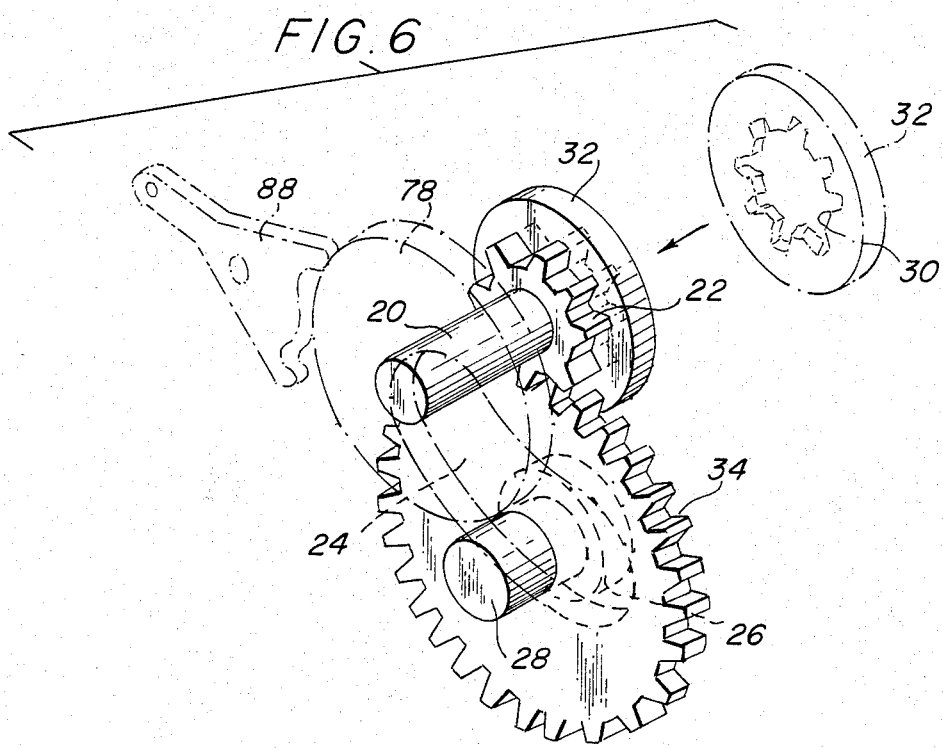
FIG. 6 is a perspective view of a reclining angle adjustment device in which a relationship between the first pinion and gear is shown.
Figure 7:
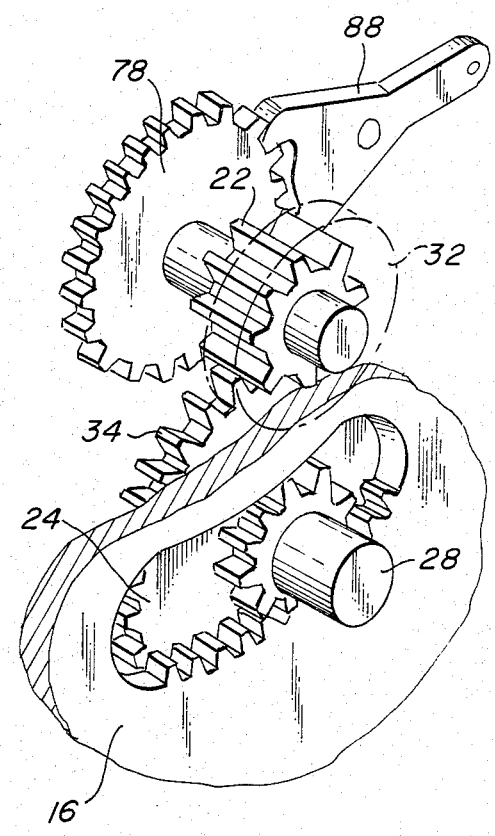
FIG. 7 is a perspective view of a reclining angle adjustment device in which a relationship between a feeding pawl member and feeding gear is shown.

In a mechanism for minute adjustment of reclining seat, a feeding gear 78 is fixed to one end portion of the first axis 20 through a flange 80. Furthermore, the second control lever 82 of which the extremity is bent inwardly to surround feeding gear 78 is fixed to the first axis 20 by means of snap ring 84. Teeth 86 of feeding gear 78 are in engagement with a feeding pawl member 88 which has two pawls 90a and 90b at its end portions, respectively. Feeding pawl member 88 is rotatably mounted on a pin member 92 projecting from the second control lever 82. One side portion of feeding pawl member 88 includes a projection 94 which has small hole 96 with which one end of a spring member 98 is in engagement. The other end of a spring member 98 is in engagement with a small hole 100 which is provided in a projection 102. A change-over lever 104 is rotatably mounted on a pin member 106 projecting from the second control lever 82 at its end portion. Furthermore, one end of change-over lever 104 is projected out of the second control lever 82 shown in FIGS. 3 and 8.

In the figures, reference numeral 108 identifies a coil spring of which one end is in engagement with a projection 110 projecting from the second auxiliary arm member 62 and the other end is in engagement with a hole 112 provided in stopper 72. Stopper 72 is continuously pulled down relative to regulating plate 42 by way of tension generated by coil spring 108.

In operation, the device according to the present invention is positioned as shown in FIG. 3. Thus, stopper 72 is in engagement with rectangular recess 46a of regulating plate 42 so that seat back arm 14 is kept locked.

When a passenger wants to obtain a relatively large variation of inclination for the reclining seat, it is necessary for him to perform rough adjustment. For rough adjustment, at first, the first control lever 76 should be rotated forwardly by the passenger. Accordingly, rotating shaft 60 rotates simultaneously in the same direction with the first control lever 76 so that stopper 72 moves around forwardly against coil spring 108 to disengage pawl 74 out of rectangular recess 46a. Consequently, the reclining angle adjusting device becomes unlocked so that the passenger can freely incline the seat backwards. After that, coil spring 108 forces stopper 72 to move downwardly to be locked when the passenger releases the first control lever 76.

Figure 5:
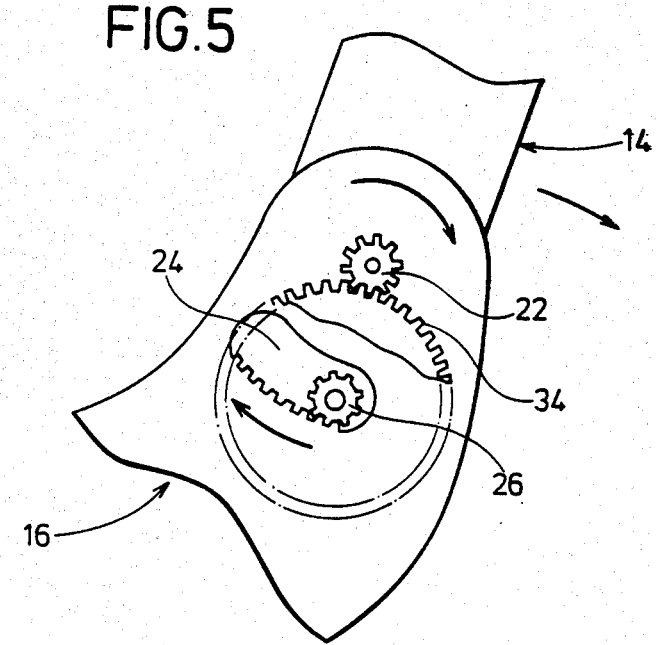
FIG. 5 is a front view of a portion of a reclining angle adjustment device by which a relationship among the first pinion, large gear and the second pinion is shown.

For minute adjustment, at first, the passenger should change change-over lever 104 upwardly as shown in FIGS. 3 and 4 so that feeding pawl member 88 moves clockwise on pin member 92 by means of spring member 98. Thus, pawl 90a becomes engaged with feeding gear 78. In this position, pawl 90a makes feeding gear 78 rotate clockwise as second control lever 82 is moved upwardly (as shown by an arrow a in FIG. 3). Consequently, the first axis 20 rotates clockwise to rotate the first pinion 22 in the same direction so that gear 34 engaged with the first pinion 22 rotates counterclockwise. Because of a difference in the number of teeth between the first pinion 22 and gear 34, the rotating force of the first pinion 22 is transferred to gear 34 at reduced speed. Furthermore, the force is transferred to the second pinion 26 which is coaxially fixed on the second axis 28 with gear 34. The second pinion 26 rolls within hole 24 so that seat back arm 14 inclines backwardly as shown in FIG. 5. When the second control lever 82 is moved downwardly, pawl 90a slides on feeding gear 78. In this position, seat back 10 will be gradually inclined backwardly by repeating the above operation.

When a passenger wants to incline the seat back fowardly, the second control lever 82 should be repeatedly moved upwardly and downwardly as described above after change-over lever 104 is moved downwardly. That is, feeding pawl member 88 moves counterclockwise by spring member 98 so that pawl 90b becomes engaged with feeding gear 78. In this position, pawl 90b rotates feeding gear 78 counterclockwise when the second control lever 82 is moved downwardly. Accordingly, the first axis 20 rotates counterclockwise and gear 34 rotates clockwise through the first pinion 22 on the first axis 20. The second pinion 26 rotates clockwise to roll within hole 24 so as to incline seat back arm 17 forwardly.

Apparent from the above description, the inclination of a seat back is due to rolling of the second pinion 26 within hole 24. While a passenger on the seat wants to incline seat back 10 without any operation of the second control lever 82, the force will be converted to one which rotates the second pinion 26 so that the force will be transferred to brake plate 32 through gear 34 and the first pinion 22. The rotating force in brake plate 32 is a sort of speed up gear train from the view point of gear 34 so that the force will become very small through the above gear train. Furthermore, a control force against rotation is generated by brake plate 32 with base arm 16 because of frictional force so that no rotation will take place by the first pinion 22. That is, a force given to seat back 10 will not make any inclination.

According to the present invention as described above, the inclination of a reclining seat will be performed very easily by way of rotating the first control lever and the second control lever either backwardly or forwardly.

Furthermore, the reclining angle adjusting device of the present invention is simple in construction so that the cost of manufacture is reduced. Thus, the reclining seat including the device of the present invention will be provided to customers at an inexpensive price.

While the invention has been particularly shown and described with respect to a preferred embodiment thereof, it will be understood by those in the art that various changes in form and detail may be made therein without departing from the spirit and scope of the invention. For example, it is possible to increase the number of rectangular recesses to more than two (2) as shown in FIG. 2 and also a large control force will be generated when the external diameter of brake plate becomes larger. Furthermore, it is unnecessary to provide a brake plate in the device where a given frictional force is generated between the first pinion and other members when the construction of the device is completed. Furthermore, control power can be imposed on one side wall portion of brake plate instead of a peripheral side thereof.

What is claimed is:

1. A reclining angle adjustment device for a reclining seat, comprising:
    a seat back arm which is fixed to a seat back portion being rotatably mounted on a first axis,
    a base arm which includes an arc type internal gear therein and is fixed to a seat portion being rotatably mounted on said first axis,
    a first control lever for rough adjustment of reclining angle rotatably mounted on said seat back arm rotating a stopper clockwise and counterclockwise,
    a regulating plate being engaged with said stopper,
    a second control lever for minute adjustment of reclining angle rotatably mounted on said first axis coaxially with the first pinion,
    a relatively enlarged gear which is fixed on a second axis and is engaged with a first pinion being rotated by said second control lever,
    a second pinion which is fixed on said second axis coaxially with said relatively enlarged gear being engaged with said arc type internal gear, and
    a brake member which obstructs rotation of said first pinion by means of friction force generated with said base arm
    wherein said second control lever includes a feeding gear and a feeding pawl which is engaged with said feeding gear to roll said second pinion through said relatively enlarged gear.

2. A reclining angle adjustment device according to claim 1,
    wherein said feeding pawl rotatably mounted on said control lever through a pin member has bifurcated pawls so as to be engaged with said feeding gear by way of adjustment of a change-over lever projecting from said second control lever.

3. A reclining angle adjustment device according to claim 2,
    wherein said feeding pawl is connected with said change-over lever by means of a spring member.

4. A reclining angle adjustment device according to claim 2,
    wherein a periphery of said second control lever is bent inwardly so as to surround said feeding gear and a portion of said change-over lever.

5. A reclining angle adjustment device according to claim 4,
    wherein said feeding pawl and change-over lever are rotatably mounted on said second control lever through pin members respectively.

6. A reclining angle adjustment device according to claim 1,
    wherein said brake plate is pressed into said base arm so as to have frictional force between said brake plate and base arm.

* * * * *